United States Patent [19]

Tenkumo

[11] 3,762,285
[45] Oct. 2, 1973

[54] CONTROL APPARATUS FOR VARYING CAMERA EXPOSURE CONDITIONS

[75] Inventor: Shohei Tenkumo, Sakai-shi, Japan

[73] Assignee: Minolta Camera Kabushiki Kaisha, Osaka-shi, Japan

[22] Filed: Apr. 7, 1971

[21] Appl. No.: 132,105

[30] Foreign Application Priority Data
Apr. 7, 1970 Japan.............................. 45/29021

[52] U.S. Cl. ............ 95/10 CE, 95/10 C, 95/10 CT, 95/10 CD, 95/64 R
[51] Int. Cl. ............................................ G03b 7/08
[58] Field of Search........................ 95/10 CE, 64 R

[56] References Cited
UNITED STATES PATENTS
3,584,561  6/1971  Starp.................................. 95/64 R Primary Examiner—Samuel S. Matthews
Assistant Examiner—Russebl E. Adams, Jr.
Attorney—Watson, Cole, Grindle & Watson

[57] ABSTRACT

The exposure conditions determined by a light receptive element and the control of an exposure are varied in accordance with at least one of a number of exposure parameters by control apparatus wherein a member is set in accordance with at least one of the exposure parameters. An exposure setting member is movable from a first position and positions shifted therefrom. A first operating mechanism is movable from a rest position to an operating position to shift the exposure setting member and a second operating mechanism moves the first operating mechanism predetermined distances from the rest position to its operating position. The exposure setting member is successively adjusted by predetermined successive amounts during successive film winding operations.

7 Claims, 6 Drawing Figures

CONTROL APPARATUS FOR VARYING CAMERA EXPOSURE CONDITIONS

IN THE SPECIFICATION:

The present invention relates to exposure control devices for cameras and more particularly to such devices wherein the exposure parameters are varied for each successive photograph taken.

In the prior art, a photographer sets up the proper exposure value on the basis of experience, or the exposure parameters are set up in accordance with the indication of an exposure meter, or the exposure parameters are automatically set up. However, whether these exposure parameters were indeed the proper values or not for the actual photographic scene does not become clear until they are developed and fixed.

Therefore, in the case where the scene to be photographed is difficult to reproduce such as occurs in the case of backlight photographing, or in the case of color photographing it is impossible to determine whether the proper exposure is set up or not.

In such cases, by changing the exposure parameters a number of photographs are taken, however, for each individual photograph the exposure parameters must be adjusted, which is cumbersome and difficult. Also there is the possibility that the opportunity for taking the photograph will be missed.

OBJECT OF THE INVENTION

One object of the present invention is to provide an exposure control device for a camera which obviates the prior drawbacks mentioned above.

Another object of the present invention is to provide an exposure control device for a camera, in which the exposure parameters are automatically altered with the taking of each successive photograph of a single scene.

Further another object of the present invention is to provide an exposure control device for a camera, in which at least one exposure parameter is changed so as to be above and below a nominal value for that exposure parameter.

Still another object of the present invention is to provide an exposure control device for a camera, which is provided with a change over device for switching on or off the operation of the exposure changing member.

SUMMARY OF THE INVENTION

In order to attain the above-mentioned objects the present invention is characterized in that an exposure setting member is connected with an input member and output member, and the input member is engaged with an exposure value change device connected with a photographic preparative operation member for winding a film in a camera or the shutter, or with exposure termination, so as to operate the output member to change at least one value of the exposure parameters about the setting exposure value of the exposure setting member.

DESCRIPTION OF THE PREFERRED EMBODIMENT

Figure 1:
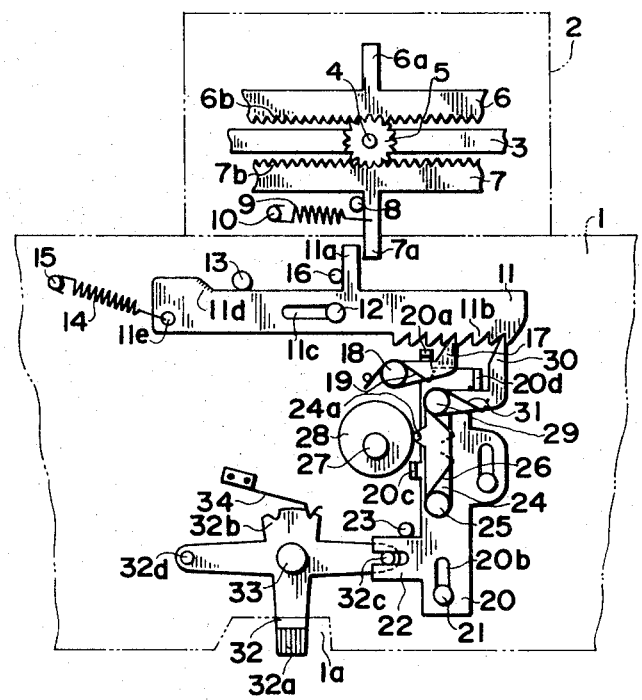
FIG. 1 is a plan view of an embodiment of the present invention.
Figure 2:
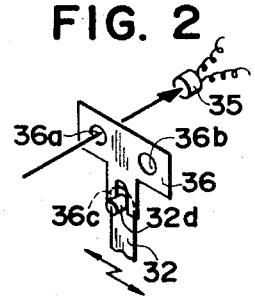
FIG. 2 is a partial perspective view of that embodiment for changing the exposure value.
Figure 3:
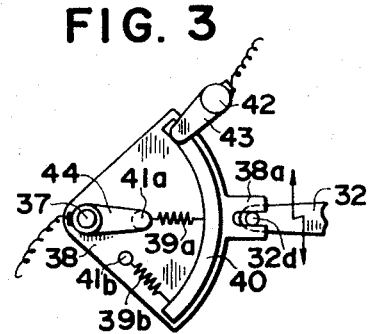
FIG. 3 is a detail of an embodiment of the electric shutter control mechanism.

In the first embodiment in accordance with the present invention shown in FIGS. 1, 2, and 3, lens barrel 2 is mounted to camera body 1 and inside thereof there is rotatably provided a ring type exposure setting member 3 for setting up the shutter speed or the diaphragm, or both of them programmatically. On fixed shaft 4 projecting from exposure setting member 3 gear 5 is rotatably supported. Output member 6 is provided with projection 6a connected with a well-known diaphragm or a shutter speed change mechanism not shown in the drawings, or a program value change mechanism. Rack 6b meshes with gear 5. Input member 7 is provided with connection projection 7a, and given a turning tendency to the left in FIG. 1 by spring 9 provided between projection 7a and pin 10 provided fixedly on lens barrel 2. Stop 8 limits the leftward movement of input member 7. Rack portion 7b also meshes with gear 5.

When exposure setting member 3 is manually moved in accordance with the intention of the photographer or the indication value of the exposure meter, or turned by being interlocked with the exposure meter, input member 7 is held stationary in contact with stop 8, so that gear 5 moves on rack portion 7a to move output member 6 to the left or right. The value of the diaphragm or the shutter speed is thereby set up on the basis of the setting on exposure setting member 3. Moreover, in the case where only the diaphragm or the shutter speed is set up it is understood that the shutter speed or the diaphragm must be set up for a certain value beforehand.

Intermediate member 11 is the exposure change device and is mounted by guide slot 11c on pin 12 provided fixedly on camera body 1, and biased to the left by spring 14 so that slope 11d on the left end of intermediate member 11 is in contact with guide pin 13 mounted on camera body 1. Spring 14 is mounted between pin 11e on intermediate member 11 and pin 15 mounted on the left front side of intermediate member 11 on camera body 1. Projection 11a is in contact with stop pin 16 and engages with the left side edge of connection projection 7a of input member 7. Locking pawl 17 on shaft 18 is biased by spring 19 to engage with teeth 11b of intermediate member 11.

Change over member 20 slidable within long slot 20b on pin 21 mounted on camera body 1 and engages at its fork-shaped arm portion 22 with operation lever 32, and is in contact with stop pin 23. Pin 25 on change over member 20 pivotally mounts swing lever 24 and is given a counter-clockwise turning tendency by spring 26. And, protuberance 24a of swing lever 24 interlocks with a film winding mechanism not shown in the drawing and is in contact with rotatable eccentric cam 28 on shaft 27. Feed pawl 30 having a leftward turning tendency through spring 31 is pivoted on shaft 29 so as to engage with teeth 11b of intermediate member 11. Angled projections 20a and 20d on change over member 20 disengage locking pawl 17 and feed pawl 30 from saw-tooth portion 11b when change over member 20 descends. Angle 20 c is formed on the side edges of change over member 20 for checking unnecessary counter-clockwise rotation of swing lever 24.

Operation lever 32 pivoted on camera body 1 by shaft 33 is composed of a cross type lever, and knob 32a on its rear arm projects into dent 1a on the back of the camera body and its front arm 32b is formed with an arcuate surface having two notches and springily contacting the free end of plate spring 34 one end of which is fixed to the camera body so as to constitute a well known click mechanism. And, pin 32c provided fixedly on the right arm of lever 32 fits in fork shaped arm portion 22 of change over member 20, and pin 32d interlocks with the device for setting up the exposure control member higher or lower than the reference exposure value.

One example of a device for setting up the exposure is shown in FIG. 2, wherein relative to light receiving element 35 connected to an appropriate photometric circuit there is disposed diaphragm plate 36 having stop hole 36a for restricting the incident light quantity from an object to indicate or control the reference exposure quantity by a well known means. Stop 36b indicates or controls the exposure value different therefrom by as much as a unit exposure value. Fork shaped arm portion 36c of diaphragm plate 36 engages with pin 32d on operation lever 32.

Further, in FIG. 3 such a device is utilized in a well known electric shutter which is provided with an electromagnet and a switching circuit, and in which exposure time is controlled by an RC time constant. In FIG. 3, on sector insulating rotary base plate 38 pivoted on shaft 37 there are radially disposed capacitors or resistances 39a, 39b forming the RC time constant element. The outer ends of the time constant element are connected to common terminal 40 and the inner ends thereof are respectively connected to independent contacts 41a, 41b. The tip of central slider 44 mounted to shaft 37 is alternately connected to contact 41a or contact 41b in accordance with the rotation of base plate 38. Circumferential slider 43 which slides through the force of spring 42 is always in contact with common terminal 40 regardless of the turning position of base plate 38. Circumferential slider 43 and central slider 44 are connected to a well known electric shutter circuit not shown in the drawing. And, one of the time constant elements represents the reference exposure value while the other time constant elements represent higher and lower exposure values. Pin 32d on operation lever 32 is fitted in fork-shaped arm portion 38a on base plate 38.

Upon turning knob 32a of operation lever 32 clockwise, in FIG. 2 and FIG. 3 stop hole 36a for obtaining the reference exposure value faces photoconductive element 35 or time constant element 39a and at the same time pin 32c slides change over member 20 backward and accordingly feed pawl 30 thereof is withdrawn from saw-tooth portion 11b of intermediate member 11. Angle 20a turns locking pawl 17 clockwise to disengage it from saw-tooth portion 11b, so that intermediate member 11 remains fixed without moving to the right because of film winding and accordingly a photograph is taken in accordance with the reference exposure value.

Next, when taking photographs with different exposure values in succession, knob 32a of operation lever 32 is turned counter-clockwise. And, thus, in FIG. 2 diaphragm plate 36 is turned so that instead of stop hole 36a stop hole 36b for giving, for example, a one grade lower exposure value faces light receiving element 35. In the same manner, in FIG. 3 base plate 38 is turned in order that time constant element 39b for a one grade lower exposure than time constant element 39a is connected, and simultaneously with this, change over member 20 ascends to the position shown in FIG. 1, and feed pawl 30 engages with the right end tooth of saw-tooth portion 11b and locking pawl 17 engages with the fourth tooth.

Thereupon, upon setting up manually or automatically setting member 3 in accordance with the exposure value at which the one grade lower exposure is decided and taking the first photograph, the photograph of one grade lower exposure value than the reference exposure is effected. Then, upon winding the film, eccentric cam 38 moves swing lever 24 to the right and feed pawl 30 moves saw-tooth form portion 11b of intermediate member 11 to the right by one tooth portion. Locking pawl 17 engages with the fifth tooth and feed pawl 30 engages with the second tooth as a result of the left movement of swing lever 24. By means of the rightward movement of one tooth portion of intermediate member 11 output member 6 of setting member 3 is set to a one grade higher exposure value, and accordingly in the subsequent photograph the reference exposure value can be effected.

Then, upon winding the film locking pawl 17 engages with the sixth tooth and feed pawl 30 engages with the third tooth to move output member 6 to a one grade higher exposure value through intermediate member 11.

Then, upon winding the film intermediate member 11 comes into contact with pin 13 through slope 11d, and intermediate member 11 itself is turned counter-clockwise about pin 12 and its saw tooth portion 11b is disengaged from locking pawl 17 and feed pawl 30. Intermediate member 11 is pulled to the left by spring 14 and restored to the position shown in FIG. 1. In this manner, it is possible to effect the photograph of the reference exposure value, the exposure of one grade greater than that, and the exposure of one grade lower than that.

The embodiment described above is one in which the exposure value is mechanically changed, however, with reference to Figs. from 4 to 6 an embodiment wherein the exposure value is electrically changed so as to be used in an electric shutter will be described.

Figure 4:
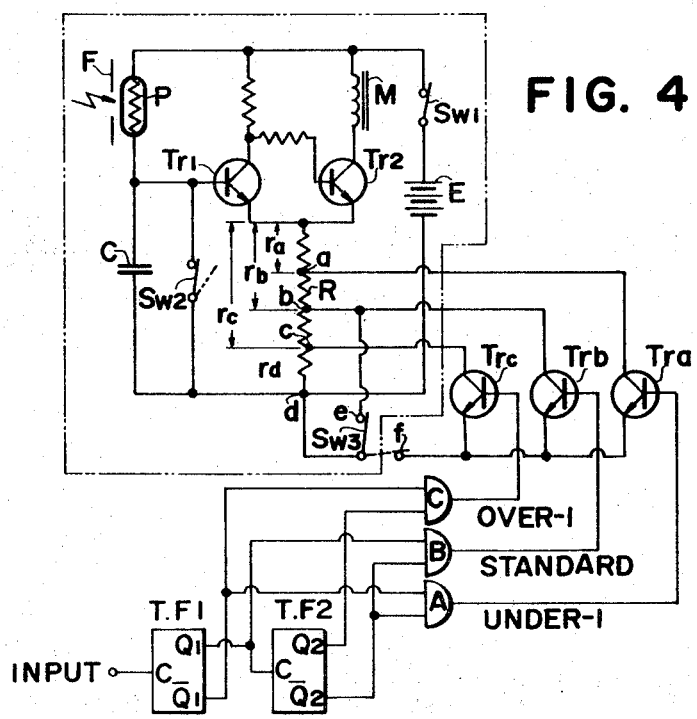
FIG. 4 is a circuit diagram of another embodiment of electric means in accordance with the present invention.

In FIG. 4, the circuit enclosed by the chain line is a well known electric shutter circuit making use of a Schmidt trigger circuit, and the difference between that circuit and the prior art circuit is that there are provided intermediate taps $a, b, c$ which individually determine the resistance value of setting resistance R of the trigger level. Also the selective circuit composed of transistors $T_{ra}, T_{rb}, T_{rc}$ for short-circuiting a portion of resistance R connects intermediate taps $a, b, c$ in turn to the negative side of the power source by means of electric signals generated in interlocking with the film winding operation or the exposure termination operation.

P is a photoconductive element the resistance value of which is changed in accordance with incident light rays and in front thereof there is disposed diaphragm device F the opening area of which is changed by setting the film sensitivity and constitutes a delay circuit together with condenser C. Switch $SW_2$ is connected in parallel with capacitor C. The junction between photoconductive element P and capacitor C is connected to the base of first transistor $Tr_1$ the collector of which is connected to the base of second transistor $Tr_2$ through a resistance, and power switch $SW_1$. Between the collector of second transistor $Tr_2$ and power switch $SW_1$ there is connected electromagnet coil M for controlling the closing operation of the shutter. The emitters of the first and second transistors are connected to capacitor C and the negative side of the power source through setting resistance R of the trigger level having intermediate taps $a, b, c$. Both transistors $Tr_1, Tr_2$ constitute a Schmidt trigger circuit.

Therefore, when power switch $Sw_1$ is closed first transistor $Tr_1$ becomes non-conductive and second transistor $Tr_2$ becomes conductive. Accordingly the closing operation of the shutter movement is checked. And then, the shutter is started and simultaneously count-switch $SW_2$ is opened, and the current running through photoconductive element P is charged by capacitor C, and when its charging voltage reaches the trigger level both transistors $Tr_1, Tr_2$ are switched and electromagnetic coil M is demagnetized and accordingly the closing operation of the shutter is effected.

Between intermediate taps b and d change over switch $SW_3$ is provided, and when switch $SW_3$ is connected to contact e as shown in FIG. 4 taps $b$ and $d$ are short-circuited, and the trigger level is determined by resistance value $r_b$ at tap $b$ of setting resistance R. Now, provided $r_b$ is the reference exposure setting value, when change over switch $SW_3$ is on the contact $e$ side an automatic exposure due to the ordinary reference exposure value is effected.

Figure 5:
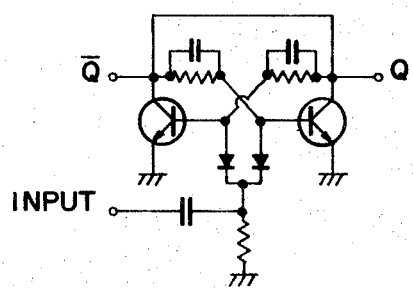
FIG. 5 is a partial circuit diagram of a T-type flip-flop circuit used in the embodiment of FIG. 4.
Figure 6:
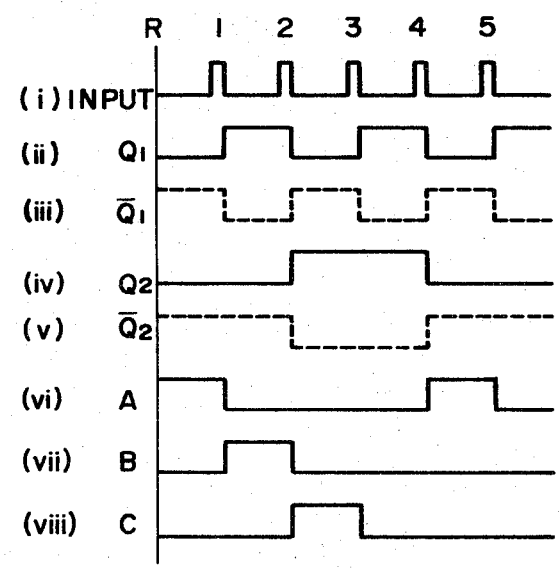
FIG. 6 is an illustrative diagram showing the relation between the input and output signals for the embodiment of FIG. 4.

Next, in the case where the exposure value undergoes a change, $TF_1$ and $TF_2$ shown in FIG. 4 are a T type flip-flop circuit shown in FIG. 5 respectively, and outputs Q, $\bar{Q}$ generated for input pulse signals undergo a change and both outputs undergo a change symmetrically as shown in FIGS. 6 (ii) (iii). The input pulse to the flip-flop circuit is a pulse generated by the termination of exposure or a pulse generated by the winding of the film. $Q_1$ is input into second T type flip-flop circuit $TF_2$. Therefore, outputs $Q_2, \bar{Q}_2$ from the $TF_2$ circuit change for every output $Q_1$ from $TF_1$ and switch to the output level of $Q_2, \bar{Q}_2$ shown in FIGS. 6 (iv), (v) relative to $Q_1$ shown in FIG. 6 (ii).

A, B, C are all AND circuits, and into AND circuit A output $\bar{Q}_1$ from $TF_1$ circuit and output $\bar{Q}_2$ from $TF_2$ circuit are provided, and only when both outputs $\bar{Q}_1, \bar{Q}_2$ are up is AND circuit A turned ON to energize transistor $Tr_a$. Output $Q_1$ from $TF_1$ and output $\bar{Q}_2$ from $TF_2$ are provided to AND circuit B in the same way as in the case of AND circuit A and only when both $Q_1, \bar{Q}_2$ are up is AND circuit B turned ON to energize transistor $Tr_b$. AND circuit C energizes transistor $Tr_c$ only when output $\bar{Q}_1$ from $TF_1$ and output $Q_2$ from $TF_2$ are both up. As shown in FIG. 6, therefore, relative to the input pulse shown by (i), AND circuit A is turned ON until the first pulse is fed as shown by (v), and AND circuit B is turned ON between the first pulse and second pulses as shown by (vii), and AND circuit C is turned ON between the second pulse and third pulses. Between the third pulse and fourth pulse all AND circuits are turned ON.

That is, in FIG. 4 in the case where change over switch $SW_3$ is switched to contact $f$ and the photographing is repeated, transistor $Tr_a$ energized for the first photograph switches the trigger level of the Schmidt circuit to resistance value $r_a$. Transistor $Tr_b$ energized for the second photograph switches the trigger level of the Schmidt circuit to resistance value $r_b$ which at this time coincides with the trigger level for a normal photograph in which change over switch $SW_3$ is switched to contact e. Further, for the third photograph transistor $Tr_c$ is energized and switches the trigger level of the Schmidt circuit to resistance value $r_c$. For the fourth photograph all transistors become non-conductive, so that the resistance value of the trigger level of the Schmidt circuit is $r_d$. When the difference of resistances $r_a, r_b, r_c, r_d$ is arranged to produce the difference of a unit exposure value, in the first photograph the exposure of one grade under the reference exposure value, in the second photograph the reference exposure value, in the third photograph the exposure of one grade greater than the reference, and in the fourth photograph the exposure of two grades greater than the reference are automatically effected in turn.

That is, the same operations as in the first embodiment can be effected all electrically in the electric shutter.

As shown in both embodiments, in the present invention it is possible to take repeated photographs or successive photographs changing automatically to different exposure values approximate to the normal setting exposure value.

What is claimed is:

1. Control apparatus in a camera for varying exposure conditions determined by a light receptive element and means for controlling exposure in accordance with at least one of a number of exposure parameters, comprising:

means for controlling at least one of said number of exposure parameters and including a number for setting at least one of said exposure parameters and an exposure setting member movable from a first position set by said member and positions shifted therefrom;

means for adjusting said means for controlling and including a first operating mechanism movable from a rest position to an operating position for shifting said exposure setting member in accordance with said operated position and a second operating mechanism for moving said first operating mechanism predetermined respective distances from said rest position to said operating position; and means for operating said means for adjusting by predetermined successive amounts during successive film winding operations.

2. Control apparatus as in claim 1 further comprising manually settable selecting means alternatively settable between a first position for selecting normal exposure conditions wherein said second operating mechanism is disengaged from said first operating mechanism, and a second position for selecting exposure conditions differing from said normal exposure conditions by a predetermined value.

3. Control apparatus as in claim 1 further comprising means for resetting said second operating mechanism from said operated position to said rest position subsequent to termination of a predetermined number of film winding operations.

4. Control apparatus as in claim 1 wherein said means for controlling comprises electrical timing means including variable resistance means varied for adjusting the exposure time;
   said means for adjusting comprises a number of switching means each controlling a respective portion of said variable resistance means; and
   said means for operating comprises means for controlling said number of switching means whereby said number of switching means are selected in response to a film winding operation.

5. Control apparatus as in claim 4 whereby said number of switch means comprises a corresponding number of transistors each one of said number of transistors respectively shunting a portion of said variable resistance means, and said means for controlling includes additional switch means responsive to a film winding operation for sequentially controlling one of said number of transistors.

6. Control apparatus as in claim 4 wherein said electric timing means further includes means for integrating, a switching circuit biased by said variable resistance means, and means actuated by the output of said switching circuit for controlling said exposure.

7. Control apparatus as in claim 6 wherein said means for integrating includes light receptive means and a capacitor serially interconnected therewith, and further comprising manually settable selecting means alternatively settable between a first position for selecting normal exposure conditions wherein said second operating mechanism is disengaged from said first operating mechanism, and a second position for selecting exposure conditions differing from said normal exposure conditions by a predetermined value.

* * * * *